(12) United States Patent
Bariant et al.

(10) Patent No.: US 11,628,857 B2
(45) Date of Patent: Apr. 18, 2023

(54) CORRECTING A POSITION OF A VEHICLE WITH SLAM

(71) Applicant: Valeo Schalter und Sensoren GmbH, Bietigheim-Bissingen (DE)

(72) Inventors: Jean-Francois Bariant, Bietigheim-Bissingen (DE); Anto Michael, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 86 days.

(21) Appl. No.: 16/964,356

(22) PCT Filed: Jan. 10, 2019

(86) PCT No.: PCT/EP2019/050485
§ 371 (c)(1),
(2) Date: Jul. 23, 2020

(87) PCT Pub. No.: WO2019/145152
PCT Pub. Date: Aug. 1, 2019

(65) Prior Publication Data
US 2021/0031795 A1 Feb. 4, 2021

(30) Foreign Application Priority Data
Jan. 23, 2018 (DE) ...................... 10 2018 101 388.4

(51) Int. Cl.
*B60W 60/00* (2020.01)
*B60W 30/06* (2006.01)
(Continued)

(52) U.S. Cl.
CPC .......... *B60W 60/001* (2020.02); *B60W 30/06* (2013.01); *G01C 21/30* (2013.01);
(Continued)

(58) Field of Classification Search
CPC . B06Y 2300/06; B60W 30/06; B60W 60/001; B60W 2420/54; B60W 2520/28;
(Continued)

(56) References Cited

U.S. PATENT DOCUMENTS 9,058,521 B2 * 6/2015 Yoon .................... G06T 7/77
9,211,912 B2 * 12/2015 Niemz ............... B62D 15/0285
(Continued)

FOREIGN PATENT DOCUMENTS

DE 102009039085 A1 3/2011
DE 102009046158 A1 5/2011
(Continued)

OTHER PUBLICATIONS

M.W.M.G. Dissanayake et al: "A solution to the simultaneous localization and map building (SLAM) problem", IEEE Transactions on Robotics and Automation, Bd. 17, Nr. 3, Jun. 1, 2001 (Jun. 1, 2001), Seiten 229-241, XP055575116, US ISSN: 1042-296X, DOI: 10.1109/70.938381 (13 pages).
(Continued)

*Primary Examiner* — Adam R Mott
*Assistant Examiner* — Elizabeth Rose Neleski
(74) *Attorney, Agent, or Firm* — Osha Bergman Watanabe & Burton LLP

(57) ABSTRACT

A method for correcting a position of a vehicle when parking in a parking space. The method includes determining the position of the vehicle on the basis of odometry information, sensing ultrasonic signals from a linear object, carrying out a method for simultaneous localization and mapping (SLAM) on the basis of the linear object and the ultrasonic signals, and correcting the position of the vehicle A control device for a driving support system of a vehicle is also disclosed, which is designed to receive odometry information of the vehicle, to receive ultrasonic signals from at least
(Continued)

one ultrasonic sensor of the driving support system, and to carry out the aforementioned method. A driving support system for a vehicle with an aforementioned control device and with at least one ultrasonic sensor is disclosed. The invention likewise relates to a vehicle with an aforementioned driving support system.

10 Claims, 2 Drawing Sheets

(51) Int. Cl.
  *G01C 21/30* (2006.01)
  *G01C 22/00* (2006.01)
  *G08G 1/14* (2006.01)

(52) U.S. Cl.
  CPC ............. *G01C 22/00* (2013.01); *G08G 1/143* (2013.01); *B60W 2420/54* (2013.01)

(58) Field of Classification Search
  CPC .. B60W 2540/18; B60W 40/02; B60W 40/12; B60W 2050/0052; G01C 21/30; G01C 22/00; G08G 1/143; G05D 2201/0213; G05D 1/0274; G05D 1/0255; G05D 1/0272; G01S 2015/935; B60R 21/0134
  See application file for complete search history.

(56) References Cited

U.S. PATENT DOCUMENTS

| | | | |
|---|---|---|---|
| 2015/0219760 A1* | 8/2015 | Hiramaki | G01S 15/08 367/99 |
| 2016/0011594 A1* | 1/2016 | Chung | G01C 3/08 701/28 |
| 2016/0188977 A1* | 6/2016 | Kearns | G05D 1/0274 348/113 |
| 2017/0132334 A1* | 5/2017 | Levinson | G01S 17/931 |

FOREIGN PATENT DOCUMENTS

| | | | |
|---|---|---|---|
| DE | 102011118726 A1 | 5/2013 | |
| DE | 102015209467 A1 | 11/2016 | |
| DE | 102016108812 A1 | 12/2016 | |
| DE | 102016114284 A1 | 2/2017 | |
| DE | 102015116220 A1 | 3/2017 | |
| DE | 102016106978 A1 | 10/2017 | |
| WO | WO-2013072134 A1 * | 5/2013 | ......... B62D 15/0285 |

OTHER PUBLICATIONS

International Search Report and Written Opinion in corresponding International Application No. PCT/EP2019/050485, dated Apr. 8, 2019 (13 pages).

German Search Report in corresponding German Application No. 10 2018 101 388.4, dated Sep. 19, 2018 (6 pages).

* cited by examiner

CORRECTING A POSITION OF A VEHICLE WITH SLAM

The present invention relates to a method for correcting a position of a vehicle, in particular when parking in a parking space, the position of the vehicle being determined on the basis of odometry information of the vehicle.

The present invention also relates to a control device for a driving support system of a vehicle which is designed to receive odometry information of the vehicle and is also designed to carry out the aforementioned method.

The present invention likewise relates to a driving support system for a vehicle with an aforementioned control device.

The present invention also relates to a vehicle with an aforementioned driving support system.

BACKGROUND OF THE INVENTION

(1) Field of the Invention

Driving support systems already today comprise widely used driver assistance systems, which assist a vehicle driver when driving the vehicle. Such driver assistance systems comprise for example parking assistance systems or distance warning systems, which are typically active at low speeds, and increasingly further assistance systems that also support driving at higher speeds, for example lane changing assistance systems and blind spot assistance systems. The driving support systems may also provide corresponding functions in autonomous vehicles, in order to support partly autonomous or autonomous movement of the vehicle.

In the case of the driving support systems known in the prior art, it is often required to monitor a surrounding environment of a respective vehicle, which is often referred to as the ego vehicle. This is performed by environment sensors of the vehicle or of the driving support system used in the vehicle. Such environment sensors may be designed as ultrasonic sensors, as radar sensors or as LiDAR sensors. Alternatively or in addition, the environment sensors may comprise cameras. The environment sensors are designed to provide sensor information comprising environment information of a surrounding environment of the vehicle. In this case, sensor information of a plurality of identical and/or different environment sensors may be combined. The environment sensors may in this case be jointly assigned to different driver assistance systems, or each assigned to a single one.

One important application for driving support systems that is already widely used today is the parking of the ego vehicle, which may comprise both parking in an identified parking space and subsequently leaving the parking space. Correspondingly, the driving support systems can support the driver of the vehicle when manoeuvring the motor vehicle, and in particular when parking the motor vehicle in a parking space and leaving the parking space, or can manoeuvre the vehicle semi-autonomously or autonomously.

The prior art already discloses driving support systems that can detect parking spaces or vacant parking places, for example by using ultrasonic sensors, in order to support the driver of the vehicle during the parking operation, or to park the vehicle semi-autonomously or autonomously in the allocated parking space, for example after confirmation by the driver of the vehicle. This concerns both parallel parking and transverse parking of the vehicle. In the case of semi-autonomous parking, the driver assistance system only takes over the steering of the motor vehicle, and the driver operates the accelerator and the brake, or vice versa. In the case of autonomous parking, no intervention by the driver of the vehicle is required any longer.

It is also known in this connection to sense the movement of the vehicle by means of odometry when manoeuvring the vehicle and in particular when parking the vehicle. In this case, the number of revolutions of the wheels, or ticks, and/or a steering angle during a movement of the vehicle may for example be sensed. Correspondingly, a driving direction of the vehicle may be determined on the basis of data of a steering angle sensor and/or a rate of rotation sensor, and an axial movement is sensed by a corresponding sensor on a wheel of the vehicle.

In order to be able to sense the movement of the vehicle as accurately as possible by means of odometry, an accurate odometry model is required. In reality, however, deviations from the odometry model may occur, for example because of production tolerances of the vehicle, modifications to the vehicle, for example using tyres of a different diameter, or else tolerances of vehicle parameters, for example a tyre inflation pressure. This also includes that the steering system of the vehicle has corresponding tolerances, or that there are tolerances with respect to the chassis and the vehicle geometry, for example the track width, a parallelism of the wheels or the like, or else an asymmetry of the vehicle.

To be able to compensate for these errors in the odometry, for example the so-called SLAM method (SLAM—Simultaneous Localization and Mapping) is used. In the case of this method, for example, a map of the surrounding environment of the vehicle may be created and the spatial position of the vehicle within this map estimated.

A basic prerequisite for a general application of SLAM is that a feature, i.e. an object on the map, can be identified, in order to be able to successively track this object during a movement of the vehicle. Such tracking is already realized on the basis of various environment sensors, for example cameras, LiDAR-based sensors, for example laser scanners, radar sensors, or others that have a wide field of view, so that the same objects can be tracked even during a movement of the ego vehicle.

In the case of ultrasonic sensors, however, SLAM methods generally cannot be used. The reason for this is that ultrasonic sensors only provide as information within their opening angle a sound transit time of a reflection of an emitted ultrasonic pulse. The signal transit time is also known as the "time of flight". The reflection in this case typically corresponds to the echo that is produced on a nearby object within the opening angle. Further information is not available from a single ultrasonic sensor. As a result, it is virtually impossible to track a single object with such ultrasonic sensors, since it cannot be ensured that a received reflection can always be assigned to the same object. In the case of vehicles, assignment is made more difficult when the vehicle is moving. When the vehicle is in traffic, it can also be assumed that the objects themselves may also be moving. Consequently, successive echoes may originate from different objects and an assignment of an echo to an object is not possible. No references that could form a basis for SLAM can be produced, so that localization of an object with respect to a reference is ruled out.

(2) Description of Related Art Including Information Disclosed Under 37 CFR 1.97 and 1.98

In this connection, DE 10 2009 039 085 A1 discloses for example a method for manoeuvring a vehicle in which a ground-level obstacle in the surrounding environment of the vehicle is sensed by at least one distance sensor of the vehicle, a distance of the obstacle from the vehicle being determined and, as a component of the vehicle that is close to the ground and/or touching the ground comes closer to the ground-level obstacle within a close range of the vehicle in which the obstacle is outside the range of detection of the distance sensor, the distance in the close range is determined while taking into account at least the information concerning the distance before it entered the close range.

DE 10 2009 046158 A1 relates to a method for detecting objects of low height by a system for obstacle detection in vehicles, the system for obstacle detection comprising distance sensors for determining the distance from objects and by means of evaluation. The method comprises the following steps: (a) continuously sensing the distance from an object by means of the distance sensors or sensing the distance from an object at specified intervals, (b) checking whether, as it approaches the vehicle, the object continues to be sensed when the distance from the distance sensors goes below a specified distance or it disappears from the range of detection of the distance sensors, (c) identifying the object that disappears from the range of detection of the distance sensors as an object of a low height.

DE 10 2015 116 220 A1 also discloses a method for the at least semi-autonomous manoeuvring of a motor vehicle in which, on the basis of sensor data of at least one ultrasonic sensor, a parking space in a surrounding environment of the motor vehicle is detected and a distance between the motor vehicle and an object delimiting the parking space is determined, a driving trajectory for parking the motor vehicle in the parking space is determined, the motor vehicle is manoeuvred along the driving trajectory and, during the manoeuvring of the motor vehicle, at a predetermined position a first distance value is determined on the basis of odometry and the determined distance and a second distance value is determined on the basis of the sensor data, the first and second distance values respectively describing the distance between the motor vehicle and the object, a correction value for correcting the driving trajectory being determined on the basis of a comparison of the first distance value and the second distance value.

BRIEF SUMMARY OF THE INVENTION

Proceeding from the aforementioned prior art, the invention is consequently based on the object of providing a method for correcting a position of a vehicle, a control device for a driving support system of a vehicle, a driving support system for a vehicle with such a control device and also a vehicle with such a driving support system of the type respectively specified above that allow reliable determination of a position of the vehicle with respect to its surrounding environment.

The object is achieved according to the invention by the features of the independent claims. Advantageous refinements of the invention are specified in the dependent claims.

Consequently, a method for correcting a position of a vehicle, in particular when parking in a parking space, is provided according to the invention, comprising the steps of determining the position of the vehicle on the basis of odometry information of the vehicle, sensing ultrasonic signals from a linear object, carrying out a method for simultaneous localization and mapping (SLAM) on the basis of the linear object and the ultrasonic signals, and correcting the position of the vehicle on the basis of odometry information by the simultaneous localization and mapping on the basis of the linear object.

Also provided according to the invention is a control device for a driving support system of a vehicle which is designed to receive odometry information of the vehicle, which is also designed to receive ultrasonic signals from at least one ultrasonic sensor of the driving support system, and is also designed to carry out the aforementioned method.

Also provided according to the invention is a driving support system for a vehicle with an aforementioned control device and with at least one ultrasonic sensor.

Also provided according to the invention is a vehicle with an aforementioned driving support system.

The basic concept of the present invention is therefore to use an object with a known structure as a basis in order to be able to carry out the method for simultaneous localization and mapping due to the known structure, i.e. in this case on the basis of the linear form of the object. The linear object is therefore used as a feature for the SLAM method. Since the linear object is straight, an exact origin of the reflection of the ultrasonic signal emitted by the ultrasonic sensor is not relevant. The ultrasonic sensor will always correctly determine the distance from the linear object on the basis of the determined sound transit time of the reflection. Therefore, a tangential criterion of a signal path of the ultrasonic pulse emitted by the at least one ultrasonic sensor to the linear object and back to the at least one ultrasonic sensor is formed by the linear object. Drifting of the vehicle position in relation to the linear object can consequently be prevented.

Determining the position of the vehicle on the basis of odometry information of the vehicle is known as such in the prior art and is therefore not explained in detail. Odometry information comprises information obtained by the vehicle itself on the basis of its odometry sensors.

When sensing ultrasonic signals from the linear object, typically an ultrasonic pulse is emitted by an ultrasonic sensor and is reflected at the linear object. The reflection is received by the ultrasonic sensor. The ultrasonic sensor determines a distance of the linear object from a transit time of the sound from the ultrasonic sensor to the linear object and back again to the ultrasonic sensor. Alternatively, the distance may be jointly determined by multiple ultrasonic sensors, in that the ultrasonic pulse is emitted by one ultrasonic sensor and the reflection at the linear object is received by at least one other ultrasonic sensor. In addition, the reflection may be received and evaluated by the ultrasonic sensor that emitted the ultrasonic pulse.

The method for simultaneous localization and mapping (SLAM) is carried out on the basis of the linear object and the ultrasonic signals. For this purpose, the vehicle position on the basis of the odometry information and odometry parameters are additionally used. On the basis of the properties of the linear object, the ultrasonic signals received from the linear object are correlated with one another, so that the object can be tracked even by the ultrasonic sensors that only provide distance information. By contrast, it is usually required in the case of known SLAM methods to determine an exact position of the object, i.e. of the linear object, in each case by the corresponding sensor, so that on that basis the tracking can be carried out.

The position of the vehicle, as determined on the basis of the odometer information, is corrected on the basis of the simultaneous localization and mapping. In this case, when parking an average vehicle in a longitudinal parking space, for example, there may be deviations of the vehicle position of approximately 10 cm as a result, which are corrected by the simultaneous localization and mapping on the basis of the linear object.

Preferably, the method for simultaneous localization and mapping is carried out continuously and in parallel with the correction of the position of the vehicle based on it, in order to progressively correct deviations of the position occurring, for example during parking.

The linear object may be a base edge, a kerbstone, a wall or the like. All that is important is that the linear object can be sensed along its length by the at least one ultrasonic sensor. Such linear objects often occur in particular in the region of parking spaces, for example as a delimitation of the parking space. In addition, it can in this case be assumed that the linear object is substantially parallel to a carriageway.

The parking space may in principle be designed in any way, for example for parallel parking or transverse parking.

The vehicle is in principle any vehicle with the driving support system. The driving support system may be a driver assistance system that is already widely used today, which supports a vehicle driver when driving the vehicle. The driving support system may also provide a corresponding function in an autonomous or semi-autonomous vehicle, in order to support autonomous or semi-autonomous driving of the vehicle.

In an advantageous refinement of the invention, the step of sensing the linear object in the longitudinal direction of the vehicle comprises verifying the sensed ultrasonic signals as belonging to the linear object. The sensing of the linear object is performed by the at least one ultrasonic sensor. Consequently, ultrasonic signals, i.e. echoes of the ultrasonic pulse emitted by the ultrasonic sensor, at objects not belonging to the linear object can be discarded. This allows the SLAM method to be carried out with great accuracy. A verification of the linear structure of the linear object therefore takes place.

In an advantageous refinement of the invention, the step of sensing a linear object in the longitudinal direction of the vehicle comprises sensing a plurality of linear objects, and the method comprises an additional step for assigning the sensed ultrasonic signals to one of the linear objects. The sensing of the linear objects is performed by the at least one ultrasonic sensor. The linear objects may in this case also be sensed and used in the method one after the other. The multiple linear objects allow the method to be carried out in a stable manner, in particular when a linear object is run over, or if the linear object no longer lies in the range of the at least one ultrasonic sensor and can no longer be sensed by it. This is the case for example when parking if the vehicle is to be parked over a kerbstone, and the parking space is additionally delimited on its side away from the carriageway by a further edge. In this case, the method may be carried out first on the basis of the kerbstone, which is sensed by the at least one ultrasonic sensor as a first linear object, and then on the basis of the delimiting edge. In this case, ultrasonic reflections received by the at least one ultrasonic sensor can be assigned to the corresponding edge, in order to avoid an erroneous correction of the vehicle position. Further environment sensors of the vehicle may be used in addition or else on their own for the basic sensing of the linear objects.

In an advantageous refinement of the invention, the step of verifying the sensed ultrasonic signals as belonging to the linear object and/or the step of assigning the sensed ultrasonic signals to one of the linear objects comprises a determination of a Mahalanobis distance. The Mahalanobis distance is a distance between points in a multi-dimensional vector space. The Mahalanobis distance is used for example in statistics in connection with multi-variant methods. In the case of multi-variant distributions, m coordinates of a point are represented as an m-dimensional column vector, which is regarded as a realization of a random vector X with the covariance matrix Σ. A distance between two points x and y distributed in this way is then determined by the Mahalanobis distance. The Mahalanobis distance is scale- and translation-invariant. Graphically, the points at the same Mahalanobis distance from a centre in the two-dimensional space form an ellipse, whereas at the Euclidean distance they form a circle. With the Mahalanobis distance, the areas at a constant distance from a point may be any conic sections.

In an advantageous refinement of the invention, the step of carrying out a method for simultaneous localization and mapping comprises carrying out a Kalman filtering. Filtering with the Kalman filter is a mathematical method that serves for reducing errors in real measured values and for providing estimates for system variables that cannot be measured. A prerequisite in this case is that the values of interest can be described by a mathematical model, for example in the form of equations of motion. A particular feature of the filter presented by Kalman in 1960 is its special mathematical structure, which allows it to be used in real-time systems. The Kalman filter is based on a state-space modelling, in which a distinction is explicitly made between the dynamics of the system state and the process of its measurement. The estimate of the state is preferably based on a knowledge of earlier observations. In this case, a minimal estimation error that is not to be corrected by the observations already made is desirable. For long series of measurements, the corresponding mathematical minimization problem quickly becomes unmanageable, since for each estimate the entire series of measurements has to be evaluated. The concept on which the Kalman filter is based is thus that of formulating the estimate at the point in time k as a linear combination of the previous estimate with the new measured value $z_k$. This is possible since the estimate at the point in time k−1 contains the information of the series of measurements $z_{k-1}, z_{k-2} \ldots z_1$. This recursive formulation of the estimating problem allows an efficient computational implementation. Apart from its manageable recursive structure, the Kalman filter also has a predictor-corrector structure. Correspondingly, in a first step of the filtering operation, the estimate from the previous timestep is subjected to state dynamics in order to obtain a prediction for the current point in time. The predictions are finally corrected with the new information of the current measured value and produce the estimates sought.

In an advantageous refinement of the invention, the method comprises an additional step for determining odometry parameters of the vehicle. The odometry parameters are obtained when carrying out the method and can be used to improve the determination of the position of the vehicle on the basis of odometry information of the vehicle. Correspondingly, for example, wheel circumferences of the vehicle can be adapted, or a steering angle conversion table.

In an advantageous refinement of the invention, the method comprises an additional step for sensing a linear object in the longitudinal direction of the vehicle, in particular by at least one ultrasonic sensor. The sensing of the linear object may in principle be performed with any desired environment sensor, that is to say for example a camera, a LiDAR-based sensor, in particular a laser scanner, a radar sensor and/or an ultrasonic sensor. Preferred here however is at least one ultrasonic sensor, which is easy to use and can be provided inexpensively. The sensing of the linear object is performed for example when driving past the parking space. Consequently, the parking space may first be sensed by the at least one ultrasonic sensor, and also the linear object in the region of the parking space may be determined. In the event that there is no linear object in the region of the parking space, the method cannot be carried out in this region.

BRIEF DESCRIPTION OF THE DRAWINGS

The invention is explained in more detail below with reference to the attached drawing and on the basis of preferred embodiments. The features described can represent an aspect of the invention both individually and in combination. Features of different exemplary embodiments can be transferred from one exemplary embodiment to another.

In the figures:

FIG. 1 shows a vehicle 10 according to a first, preferred embodiment of the present invention. In the present case, the vehicle 10 is formed as a passenger car.

DETAILED DESCRIPTION

Figure 1:
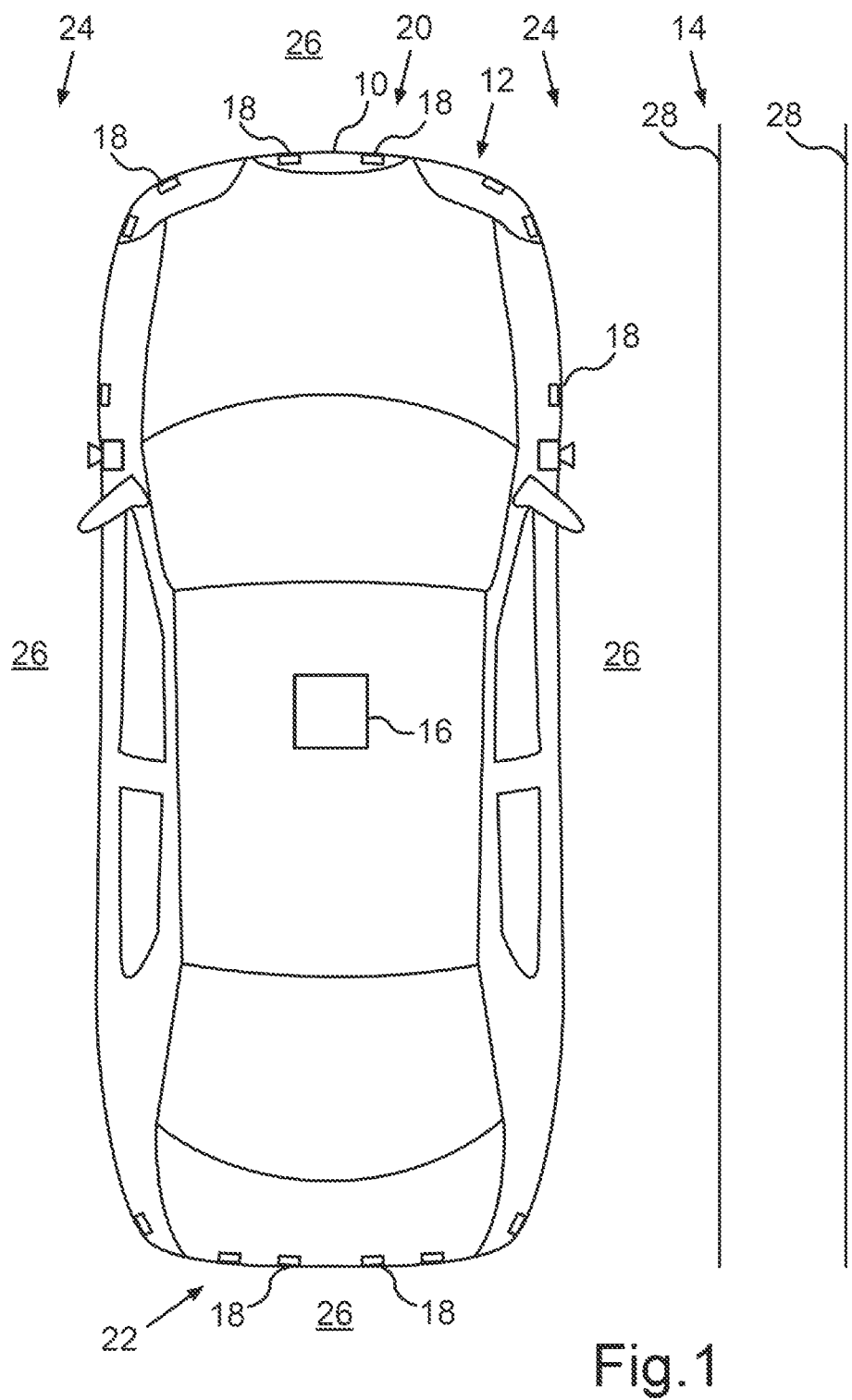
FIG. 1 shows a schematic representation of a vehicle according to a first, preferred embodiment of the invention with a driving support system comprising a plurality of ultrasonic sensors for sensing a linear object in a plan view.

The vehicle 10 comprises a driving support system 12, which in this exemplary embodiment is designed for parking the vehicle 10 in a parking space 14.

The driving support system 12 comprises a control device 16, which is formed here by an electronic control unit (ECU) of the vehicle 10. In addition, the driving support system 12 comprises a plurality of ultrasonic sensors 18. In the present exemplary embodiment, the driving support system 12 comprises fourteen ultrasonic sensors 18, six of which are arranged in a front region 20 and six of which are arranged in a rear region 22 of the vehicle 10. The ultrasonic sensors 18 in the front region 20 and in the rear region 22 of the vehicle 10 are attached to its bumpers. In addition, an ultrasonic sensor 18 is arranged on each side 24 of the vehicle 10.

Each of the ultrasonic sensors 18 is designed to send ultrasonic pulses into a surrounding environment 26 of the vehicle 10 and to receive reflections of the ultrasonic pulses produced by objects 28 in the surrounding environment 26. For example, in FIG. 1 two linear objects 28 are shown as objects.

The ultrasonic sensors 18 are in each case connected to the control device 16 by way of a data bus (not shown here) for data transmission. Sensor information produced by the ultrasonic sensors 18 is transmitted via the data bus to the control device 16, and is jointly evaluated and further processed there.

Furthermore, the control device 16 is designed to receive odometry information of the vehicle 10.

Figure 2:
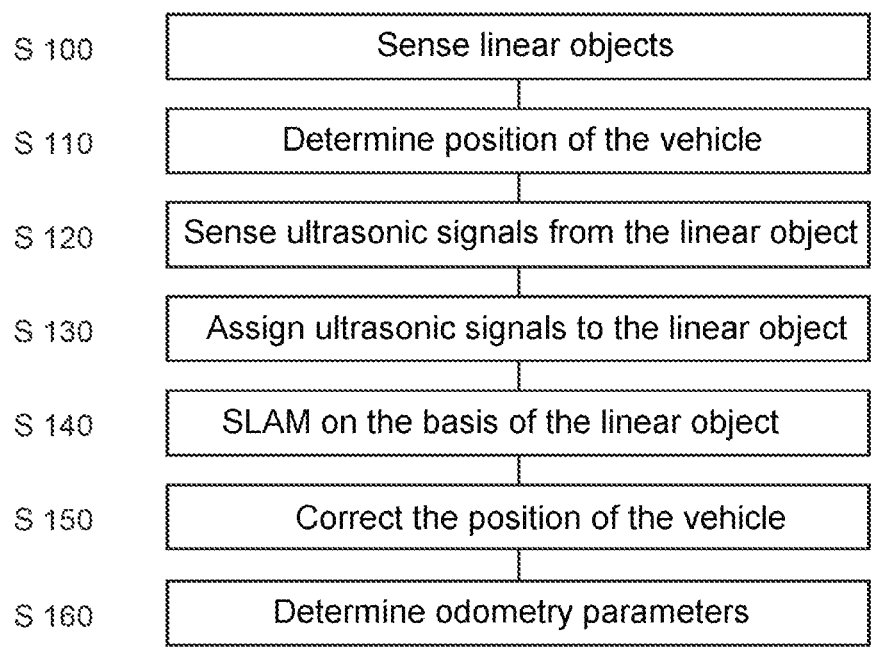
FIG. 2 shows a flow diagram of a method according to a second embodiment for correcting a position of a vehicle when parking the vehicle in a parking space and a driving support system of the first embodiment.

A method according to a second embodiment for correcting a position of the vehicle 10 when parking in the parking space 14 is described below with reference to FIG. 2. The method is carried out by the driving support system 12 of the vehicle 10 of the first embodiment.

The method begins in step S100 with sensing of the linear objects 28 in the longitudinal direction of the vehicle 10 by the ultrasonic sensor 18 positioned on the corresponding side 24 of the vehicle 10. The sensing of the linear objects 28 is performed when the vehicle 10 is driving past the parking space 14. The parking space 14 is designed here for parallel parking, and the linear objects 28 are formed here by a base edge and a kerbstone.

In the subsequent step S110, the position of the vehicle 10 is determined on the basis of odometry information of the vehicle 10. The determination is performed on the basis of information obtained by the vehicle 10 itself on the basis of its odometry sensors, i.e. a steering angle and revolutions of the wheels of the vehicle 10.

Step S120 concerns sensing of ultrasonic signals from the linear objects 28. As stated above, ultrasonic pulses are emitted by the corresponding ultrasonic sensor 18 and are reflected at the linear object 28, and the reflections are received again by the ultrasonic sensor 18. The ultrasonic sensor 18 determines a distance in relation to the linear object 28 from a transit time of the sound from the ultrasonic sensor 18 to the linear object 28 and back again to the ultrasonic sensor 18.

In a step S130, the sensed ultrasonic signals are assigned to one of the linear objects 28. It is additionally verified whether the ultrasonic signals sensed belong to the linear object 28.

Used in each case for this purpose is a Mahalanobis distance, which provides a distance between points in a multi-dimensional vector space. In the case of multi-variant distributions, m coordinates of a point are represented as an m-dimensional column vector, which is regarded as a realization of a random vector X with the covariance matrix Z. A distance between two points x and y distributed in this way is then determined by the Mahalanobis distance.

Step S140 concerns carrying out a method for simultaneous localization and mapping (SLAM) on the basis of the linear object 28 and the ultrasonic signals. The vehicle position on the basis of the odometry information and odometry parameters are additionally used for this.

The method for simultaneous localization and mapping comprises carrying out a Kalman filtering on the basis of a state-space modelling, in which a distinction is explicitly made between the dynamics of the system state and the process of its measurement. The estimate of the state is in this case based on a knowledge of earlier observations as obtained by the linear object 28.

For a parking place 14 with n linear objects 28, normally fewer than two (n<2), let $x_{k-1}^V = [x_{k-1} \ y_{k-1} \ \theta_{k-1}]^T$ be the position vector of the vehicle 10 in relation to the parking place 14. Furthermore, a set of odometry parameters is specified as a vector p. In addition, let $x_{k-1}^i$ be the position of the ith linear object 28 at the point in time k-1. This results in the Kalman state according to $$x_{k-1} = \begin{bmatrix} x_{p-1}^V \\ p \\ x_{k-1}^1 \\ \vdots \\ x_{k-1}^n \end{bmatrix}$$

Let g be the odometry function, which calculates a curve-shaped displacement vector $v = [s_k \ u_{\theta,k}]^T$ from the parameters p, the ticks of the wheels, the received steering angle and the noise vector $q=[q_s \; q_\theta]^T$ according to $$v=g(p)+q$$

The covariance of the disturbance vector is $$E[qq^T] = \begin{bmatrix} E[q_s^2] & 0 \\ 0 & E[q_\theta^2] \end{bmatrix} = \begin{bmatrix} Q_s & 0 \\ 0 & Q_\theta \end{bmatrix} = Q$$

In step S150, the position of the vehicle 10 as determined on the basis of odometry information is corrected by the simultaneous localization and mapping on the basis of the linear object 28.

The covariance of the disturbance vector gives a Cartesian displacement vector as $$u_k = \begin{bmatrix} u_{x,k} \\ u_{y,k} \\ u_{\theta,k} \end{bmatrix} = \begin{bmatrix} s_k \cos u_{\theta,k} \\ s_k \sin u_{\theta,k} \\ u_{\theta,k} \end{bmatrix}$$

The new position of the vehicle is consequently obtained as:

$$x_k^V = x_{k-1}^V + \begin{bmatrix} \cos\theta_{k-1} & -\sin\theta_{k-1} & 0 \\ \sin\theta_{k-1} & \cos\theta_{k-1} & 0 \\ 0 & 0 & 1 \end{bmatrix} \begin{bmatrix} u_{x,k} \\ u_{y,k} \\ u_{\theta,k} \end{bmatrix}$$

The aforementioned position of the vehicle results in the prediction function for the ith feature of the state in the case of a linear object 28 as:

$$x_k^i = \begin{bmatrix} \cos u_{\theta,k}(x_{k-1}^i(1) - u_{x,k}) + \sin u_{\theta,k}(x_{k-1}^i(2) - u_{y,k}) \\ -\sin u_{\theta,k}(x_{k-1}^i(1) - u_{x,k}) + \cos u_{\theta,k}(x_{k-1}^i(2) - u_{y,k}) \\ x_{k-1}^i(3) - u_{\theta,k} \end{bmatrix} =$$

$$f^i(x_{k-1}^i, u_k) = f^i(x_{k-1}, q)$$

where $x_{k-1}^i(j)$ is the ith component of the ith feature of the state (x axis, y axis and angle).

Finally, in step S160, odometry parameters of the vehicle 10 are determined. As evident from the considerations set out above, the function $f^i$ implicitly includes the odometry function g, which comprises the parameter p as the state. This correspondingly allows the odometry parameters of the vehicle 10 to be determined. Correspondingly, wheel circumferences of the vehicle 10 and a steering angle conversion table can be adapted as odometry parameters.

Steps S140, S150 and S160 are in the present case carried out in parallel, and the position of the vehicle 10 is continuously corrected on the basis thereof.

LIST OF REFERENCE SIGNS

10 Vehicle
12 Driver support system
14 Parking space
16 Control device
18 Ultrasonic sensor
20 Front region
22 Rear region
24 Side
26 Surrounding environment
28 Linear object, object

The invention claimed is:

1. A method for correcting a position of a vehicle when parking in a parking space, the method comprising:
   generating an estimate of the position of the vehicle on the basis of odometry information of the vehicle;
   sensing ultrasonic signals from a linear object;
   sensing the linear object in a longitudinal direction of the vehicle by at least one ultrasonic sensor;
   carrying out a method for simultaneous localization and mapping (SLAM) of the vehicle in a map of an environment surrounding the vehicle on the basis of the linear object and the ultrasonic signals, wherein the SLAM is performed based on the ultrasound signals providing distance information only by correlating the ultrasound signals with one another; and
   correcting the estimate of the position of the vehicle in the map on the basis of odometry information by the simultaneous localization and mapping on the basis of the linear object.

2. The method according to claim 1, wherein sensing the linear object in the longitudinal direction of the vehicle comprises verifying the sensed ultrasonic signals as belonging to the linear object.

3. The method according to claim 1, wherein sensing the linear object in the longitudinal direction of the vehicle comprises sensing a plurality of linear objects, and the method further comprises assigning the sensed ultrasonic signals to one of the plurality of linear objects.

4. The method according to claim 3, wherein verifying the sensed ultrasonic signals as belonging to the linear object and/or the step of assigning the sensed ultrasonic signals to one of the linear objects comprises a determination of a Mahalanobis distance.

5. The method according to claim 1, wherein carrying out a method for simultaneous localization and mapping comprises carrying out a Kalman filtering comprising:
   generating an initial estimate of the position of the vehicle using an odometry function, based on the odometry information; and
   correcting the initial estimate of the position on the basis of the linear object.

6. The method according to claim 5, further comprising determining the odometry parameters of the vehicle.

7. The method according to claim 6, wherein determining the odometry parameters comprises adapting the odometry function of the Kalman filter.

8. A control device for a driving support system of a vehicle which is configured to:
   receive odometry information of the vehicle;
   receive ultrasonic signals from at least one ultrasonic sensor of the driving support system; and
   carry out the method according to claim 1.

9. A driving support system for a vehicle comprising a control device according to claim 8; and at least one ultrasonic sensor.

10. A vehicle with a driving support system according to claim 9.

* * * * *